(12) United States Patent
Bentmar et al.

(10) Patent No.: US 7,922,945 B2
(45) Date of Patent: Apr. 12, 2011

(54) METHOD AND ARRANGEMENT FOR MANUFACTURING A WEB-SHAPED PACKAGING LAMINATE

(75) Inventors: Mats Bentmar, Svedala (SE); Mikael Berlin, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 1241 days.

(21) Appl. No.: 10/514,132

(22) PCT Filed: Jun. 5, 2003

(86) PCT No.: PCT/SE03/00943
§ 371 (c)(1),
(2), (4) Date: Feb. 15, 2006

(87) PCT Pub. No.: WO04/000553
PCT Pub. Date: Dec. 31, 2003

(65) Prior Publication Data
US 2006/0151096 A1      Jul. 13, 2006

(30) Foreign Application Priority Data
Jun. 24, 2002   (SE) ...................................... 0201934

(51) Int. Cl.
*B32B 37/00*   (2006.01)
(52) U.S. Cl. ................ 264/135; 264/172.19; 264/173.1; 264/212; 264/310; 264/8; 425/8; 156/244.11; 156/390; 156/501; 427/211; 427/428.12; 427/428.15
(58) Field of Classification Search ............. 156/244.11, 156/390, 501; 264/135, 8, 172.19, 173.1, 264/212, 310; 425/8; 427/211, 428, 12, 428.15
See application file for complete search history.

(56) References Cited

U.S. PATENT DOCUMENTS

| | | | | |
|---|---|---|---|---|
| 2,198,621 | A * | 4/1940 | Izard | 425/471 |
| 3,955,016 | A * | 5/1976 | Robertson | 427/178 |
| 6,071,576 | A | 6/2000 | Bentmar et al. | |
| 2001/0005550 | A1* | 6/2001 | Bengtsson et al. | 428/341 |
| 2002/0045682 | A1* | 4/2002 | Kagawa | 523/300 |
| 2002/0061413 | A1* | 5/2002 | Bentmar et al. | 428/480 |

FOREIGN PATENT DOCUMENTS

| | | |
|---|---|---|
| WO | 9417999 A1 | 8/1994 |
| WO | 0154828 A1 | 8/2001 |

* cited by examiner

*Primary Examiner* — Jennifer K. Michener
*Assistant Examiner* — Magali P Slawski
(74) *Attorney, Agent, or Firm* — Buchanan Ingersoll & Rooney PC

(57) ABSTRACT

Arrangement for manufacturing a web-shaped packaging laminate, comprising an extruder arranged so as to extrude a film of polymer material down into a nip between a cooling roll and a counter-roll, and also means of introducing at least one other layer of the packaging laminate into the said nip for joining the film together with the layer. According to the invention, the arrangement comprises an arrangement for covering the cooling roll with a surface layer of a water-based composition comprising a dry matter content. The invention also relates to the method for manufacturing the web-shaped packaging laminate, in which the composition is transferred as a thin layer to the film of polymer material in the nip, while the film of polymer material is still hot.

19 Claims, 1 Drawing Sheet

US 7,922,945 B2

METHOD AND ARRANGEMENT FOR MANUFACTURING A WEB-SHAPED PACKAGING LAMINATE

TECHNICAL FIELD

The present invention relates to a method for manufacturing a web-shaped packaging laminate, in which a film of polymer material is extruded down into a nip between a cooling roll and a counter-roll, and the said film of polymer material is joined together in the nip, directly or indirectly, with at least one other layer of the packaging laminate. The invention also relates to an arrangement for implementing the method.

State Of the Art and Problem

Packaging laminates for packagings, for example packagings intended for liquid foods, are usually constructed from a number of layers, where each layer has its particular function. Thus, for example, a core layer, which is normally made from a fibre-based material, such as cardboard, or a polymer-based material, provides the packaging to be manufactured from the laminate with strength, gripping stability and dimensional stability. One or more polymer layer(s) provide(s) liquid tightness, and a barrier layer made of, for example, aluminium foil provides an oxygen barrier. The types of layer just mentioned are usually incorporated into the laminate in the form of prefabricated web-shaped materials, the polymer layer(s) normally being extruded as a film of molten polymer material down into a nip between a cooling roll and a counter-roll, for example a rubberized impression roll. At the same time, at least one of the other prefabricated layers, usually at least the core layer, is guided into the nip so as there to be joined together over essentially its whole surface with the film of polymer material.

Other types of layer are instead incorporated into the laminate by virtue of at least one prefabricated layer in the laminate being coated with a water-based composition which comprises a dry substance content. After drying, that is to say removal of the water, the dry substance remains and then forms a layer. Such layers may be, for example, layers which provide the packaging laminate with an improved characteristic in respect of aroma barrier, gas barrier, gloss, grippability, scavenging effect, adhesion or capacity for being easily delaminated for recycling. The dry matter content may comprise, for example, polyvinyl alcohol, ethylene vinyl alcohol, ethylene acrylic acid, ethylene methacrylic acid, ascorbic acid, vitamin E, Fe or $Fe^{2+}$ compounds, carboxymethylcellulose, polyvinyl acetate or starch and also possibly nanoparticles. One problem with forming such water-based layers in the laminate is being able to make them thin but still with the requisite properties. Another problem is that expensive, bulky and complicated coating equipment is necessary for their production, which is a sufficiently great problem as far as creating a completely new line for producing packaging laminate is concerned, and an even greater problem when it is desired to supplement an existing line with coating equipment for producing such a coated layer in the packaging laminate. The only solution today is to arrange the coating equipment off-line, that is to say outside the ordinary production line, which in turn gives rise to logistical problems etc. and increased production costs.

SUMMARY OF THE INVENTION

According to the invention, a method and arrangement for manufacturing a web-shaped packaging laminate are provided, by virtue of which the abovementioned problems are reduced. More specifically, a method and arrangement for manufacturing a web-shaped packaging laminate are provided, by virtue of which a very thin layer of a water-based composition comprising a dry matter content can be incorporated into a packaging laminate. Furthermore, the arrangement according to the invention can very advantageously be included in an existing production line for the packaging laminate, with only a limited need for supplementary equipment. In a new production line for a packaging laminate, the invention results in a considerable saving in terms of space and investment costs. Maintenance costs are also reduced in comparison with a case where conventional coating equipment is used.

According to the invention, this is achieved by means of a method for manufacturing a web-shaped packaging laminate, in which a film of polymer material is extruded down into a nip between a cooling roll and a counter-roll, and the said film of polymer material is joined together in the nip, directly or indirectly, with at least one other layer of the packaging laminate, and in which the cooling roll is covered with a surface layer of a water-based composition comprising a dry matter content, which composition is transferred as a thin layer to the film of polymer material in the nip, while the film of polymer material is still hot.

The invention therefore advantageously means that a roll pair including an extruder, for producing a polymer film which is joined together with at least one other layer in the laminate in the nip between the roll pair, only needs to be supplemented with an arrangement for covering the cooling roll with the water-based composition comprising a dry matter content, and also possibly a dryer following the roll pair. Suitable arrangements for covering a roll with a surface layer of a liquid are known from the printing industry, embracing all known printing methods and arrangements which normally use one or more doctor(s) for spreading the liquid on the roll. However, it is also conceivable quite simply to cover the cooling roll by dripping or spraying.

In the nip between the roll pair, the surface layer will be transferred directly to the molten film of polymer material while this is still hot and formable. This advantageously means that "the coating" is very uniform and covers well. The heat from the film of polymer material will moreover lead to evaporation of water from the layer of the water-based composition, which advantageously means that no or only a short dryer is required in order to dry the layer completely. Another advantage is that the cooling-medium flow to the cooling roll can be reduced because the cooling roll is cooled partly by the water-based composition.

According to one aspect of the invention, the said water-based composition consists of a composition which provides the packaging laminate with an improved characteristic in the group consisting of increased aroma barrier, gas barrier, gloss, grippability, scavenging effect, adhesion or capacity for being easily delaminated for recycling the various layers in the laminate. Scavenging effect means a capacity of the laminate for consuming or "eating" oxygen, so that the oxygen does not reach the product in the packaging.

For an improved aroma barrier, use can be made of, for example, a water-based composition comprising a dry matter content of polyvinyl alcohol or ethylene vinyl alcohol. For improved gloss, use can be made of, for example, a lacquer. For improved scavenging effect, use can be made of, for example, ascorbic acid, vitamin E, or Fe or $Fe^{2+}$ compounds. For improved adhesion, use can be made of, for example, ethylene acrylic acid or ethylene methacrylic acid. For improved capacity for being easily delaminated, use can be made of, for example, carboxymethylcellulose, polyvinyl acetate or starch. For an improved oxygen barrier, use can be made of, for example, polyvinyl alcohol, ethylene vinyl alcohol, ethylene acrylic acid, ethylene methacrylic acid, ethylene vinyl acetate, styrene copolymers or combinations of these. For a further improved oxygen barrier, the composition can also include nanoparticles, preferably nanoparticles of clay mineral or of colloidal, spherical and amorphous $SiO_2$.

The examples just mentioned of dry matter content in the water-based composition are not to be regarded as limiting of the invention, but the invention is applicable to all types of water-based compositions which comprise a dry matter content.

According to another aspect of the invention, the layer of the water-based composition transferred to the film of polymer material has a water content of 0.5-8 $g/m^2$, preferably 1-5 $g/m^2$, when it has just been transferred to the film of polymer material. The dry matter content is typically 1-50% by weight. After the transferred layer has been dried, preferably by means of IR, the layer transferred to the film of polymer material has a weight per unit area of from 0.1 $g/m^2$ up to 10 $g/m^2$, preferably up to 5 $g/m^2$, even more preferably up to 3 $g/m^2$ and most preferably up to 2 $g/m^2$, on the basis of dry weights.

The viscosity and/or concentration of the water-based composition can suitably be used in order to control a layer thickness of the said composition in the packaging laminate, these parameters influencing the size of the gap which is formed in the nip between the cooling roll and the counter-roll. For compositions comprising a polymer solution, for example polyvinyl alcohol or ethylene vinyl alcohol, the concentration should be at most around roughly 20% because the viscosity becomes too high at higher concentrations. For compositions comprising a dispersion, for example ethylene acrylic acid or ethylene methacrylic acid, the concentration can be up to around 50% without the viscosity becoming too high.

According to a further aspect of the invention, the said film of polymer material comprises at least one polymer in the group consisting of polyethylene, polypropylene, ethylene acrylic acid and ethylene vinyl alcohol, of any quality suitable for packaging laminates.

If appropriate, the packaging laminate can, in a subsequent step, be provided with at least one further layer which covers the transferred layer of the water-based composition, which therefore means that the layer will constitute an intermediate layer within the laminate, which is covered by at least one outer layer. This is necessary at least in the case of adhesive layers, the very purpose of which is to bring about bonding to an outer (possibly outermost) layer located on the outside, or in the case of layers which provide delaminatability in order for it to be possible to separate the layers on either side of the layer arranged according to the invention from one another. Other types of layer, such as layers for an aroma barrier, gas barrier or scavenging effect, can also be covered by at least one outer layer.

It is also conceivable, however, for the said transferred layer of the water-based composition to constitute an external, outermost layer in the packaging laminate, which is to be arranged on either the outside or the inside of the packaging. This is necessary at least in the case of layers which are to provide improved gloss or grippability (outside) and is in some cases suitable for layers which are to provide an improved aroma barrier and/or oxygen barrier (inside). It will therefore be understood that the term "outer" or "outermost" means both layers which may be intended to face in towards the product space (inside) of the packaging to be produced from the packaging laminate and layers which are intended to face towards or to constitute the outside of the packaging.

According to a preferred embodiment of the invention, an exceptionally impermeable packaging laminate can be created in respect of an oxygen barrier, if the packaging laminate includes both a conventional oxygen barrier layer (for example aluminium foil or a layer of a polymer which has barrier properties) and an oxygen barrier layer according to the invention transferred via the cooling roll. This is because the synergy effect achieved when two or more oxygen barrier layers are used in a laminate means that the total oxygen barrier is greater than the sum of the individual barrier layers. In this case, it is preferred to use dispersible ethylene vinyl alcohol in the layer produced according to the invention, which has been made more water-insoluble by adding ethylene acrylic acid, ethylene methacrylic acid and/or nanoparticles.

According to another preferred embodiment of the invention, small what are known as pinholes in a polymer layer can be sealed by virtue of the polymer layer being coated according to the invention with a sealing water-based composition of, for example, ethylene acrylic acid or ethylene methacrylic acid. This is preferred in particular in packaging laminates which have only one polymer layer which faces in towards the interior of the packaging, in contact with a liquid food.

DESCRIPTION OF FIGURE

The invention will be described below with reference to FIG. 1 which shows diagrammatically an arrangement according to the invention.

Component 1 in FIG. 1 symbolizes a rotatable cooling roll which is normally cooled internally by means of a cooling medium (cooling liquid). The cooling roll 1 has a shell made of metal, usually steel, and preferably has an engraved surface, for example of the screen roller type, which means that its surface is capable of holding a greater quantity of water-based composition in a surface layer than a completely smooth surface does. It is also conceivable according to the invention, however, for the roll to have a completely smooth surface or a surface which varies only slightly from a completely smooth surface, for example by virtue of being matt-ground.

Figure 1:
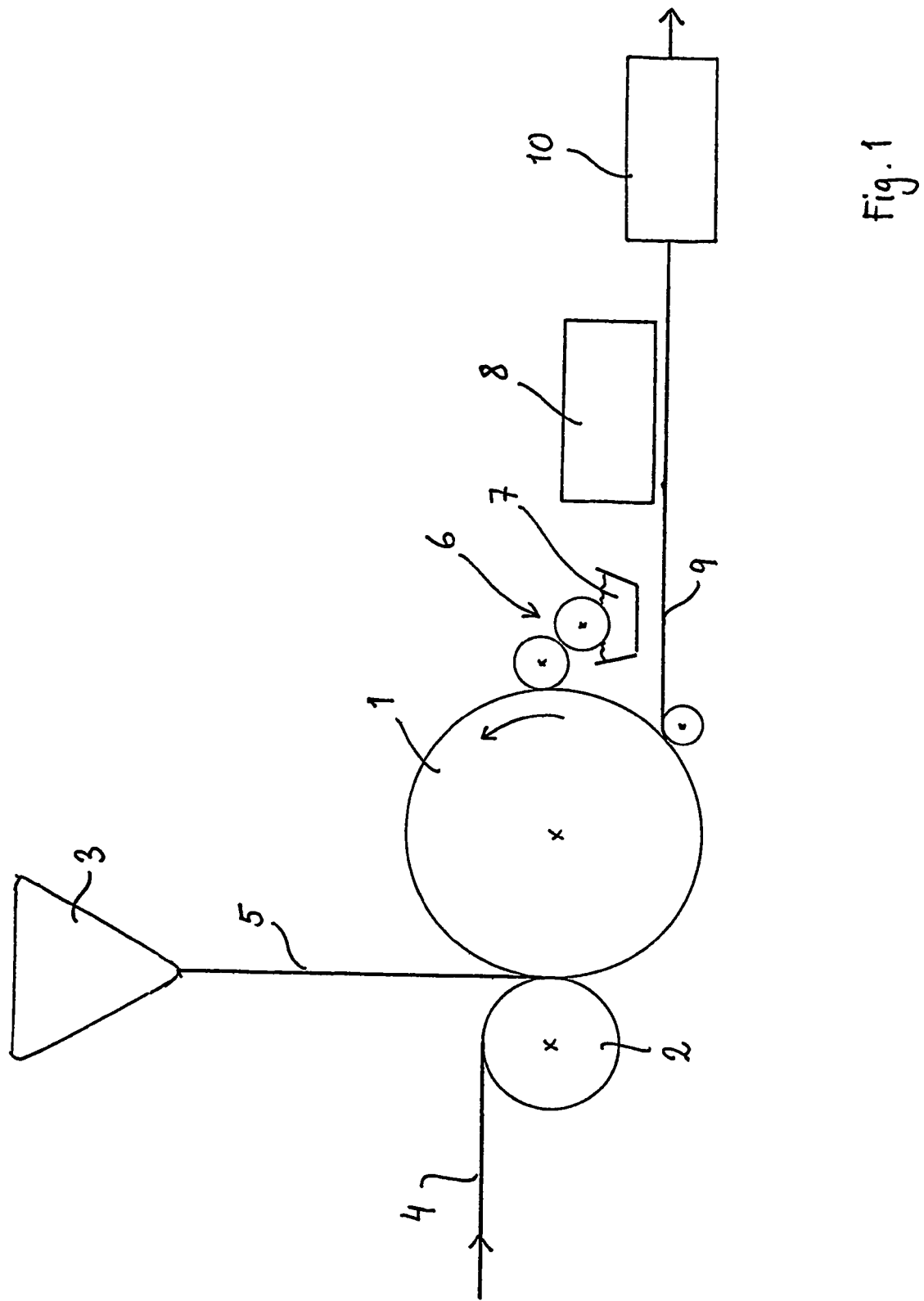

A counter-roll 2, for example a rubberized impression roll, bears against the cooling roll 1 in a position around its horizontal centre line, in a nip, with an adjustable nip pressure. A web 4 of at least one layer in the laminate to be manufactured, usually a core layer which may already have been laminated together with a barrier layer, is fed into this nip. Also fed into the nip, between the web 4 and the cooling roll 1, is a film 5 of molten polymer material extruded from an extruder 3. In the nip, the web 4 is joined together with the molten polymer film 5 over essentially the whole of their mutually facing surfaces. During the continued contact with the surface of the cooling roll 1, when the laminate of the web 4 and the film 5 runs around the cooling roll 1, the film 5 is cooled and consequently solidifies/crystallizes.

According to the invention, an arrangement 6 for covering the cooling roll 1 with a surface layer of a water-based composition 7 comprising a dry matter content is arranged on the opposite side to the nip, in a position around the horizontal centre line of the cooling roll 1. The arrangement 6 is shown here as comprising two rolls which transfer the composition 7 to the surface of the cooling roll. However, as mentioned above, many other configurations are conceivable. The covering of the water-based composition on the cooling roll 1 should of course be made as wide as the web 4 being fed into the nip and the film 5. In the nip, the surface layer present on the cooling roll will then be transferred to the polymer film 5 while this is still hot and formable. In this way, a layer of the water-based composition is formed on the polymer film, which layer will form part of the finished packaging laminate. The transfer according to the invention affords the possibility of making the layer of the water-based composition so thin that, after drying, it takes on the nature of a skin.

The arrangement also comprises means (not shown) of controlling the thickness of the layer of the water-based composition which is transferred to the polymer film 5 in the nip. The thickness is preferably controlled at least partly by means of the viscosity and/or concentration of the water-based composition.

When the packaging laminate 9, which may now be complete or constitute the foundation for further incorporation of other layers, leaves the cooling roll 1, it comprises at least one prefabricated layer (preferably a core layer), against which a polymer layer, which on its other side has a layer of the water-based composition, lies directly. While the layer of the water-based composition is situated between the surface of the cooling roll and the polymer layer, it is heated by the polymer layer (which, in the case of polyethylene, for example, is extruded at a temperature of around 280-325° C.). When the laminate 9 leaves the cooling roll 1, water will evaporate from the heated water-based composition which consequently dries at least partly.

The roll pair 1, 2 is nevertheless normally also followed by a dryer 8, preferably an IR dryer, of a length of up to a maximum of 8 m or more preferably a maximum of 5 m. The packaging laminate is subsequently ready for shaping into packagings, if appropriate by creasing and cutting into individual blanks, or the web of packaging laminate can also be conveyed on to following equipment 10 in order to provide the packaging laminate with at least one further layer on the same side of the laminate as the layer of polymer material, that is to say encapsulating the layer of the water-based composition. The other side of the laminate 9 can of course also be provided with further layers.

EXAMPLE

In the factory, trials were conducted in which an existing cooling roll was charged with a surface layer of polyvinyl alcohol according to the conditions in Table 1. A large number of samples were taken from the cardboard laminate and these had oxygen barriers of from 27 to 108 $cm^3/m^2*24$ h, 1 atm at 23° C., 50% RH. The variation was due to the fact that the trial equipment did not allow more accurate control of the layer thickness applied, which was theoretically 0.6 $g/m^2$ dry. However, the aim of the example is primarily to show that the technique according to the invention functions in practice.

TABLE 1

| | |
|---|---|
| Polymer material | LDPE |
| Laminate weight (g/m²) | 25 |
| Laminate temp. (° C.) | 325 |
| Web speed (m/min) | 25 |
| Dispersion | Mowiol 15-99 (PVOH) |
| Dry content (%) | 10 |
| Supply (kg/h) | 3.6 |
| Width applied (m) | 0.4 |
| Weight per unit area wet (g/m²) | 6 |
| Oxygen barrier | 27-108 |

The invention is not limited to embodiments shown here but can be varied within the scope of the patent claims.

The invention claimed is:

1. Method for manufacturing a web-shaped packaging laminate comprising:
   feeding a web comprising at least one layer of the packaging laminate to a nip between a cooling roll and a counter-roll, the cooling roll possessing an outer surface;
   extruding a film of polymer material into the nip between the cooling roll and the counter-roll while the web is fed into the nip to join together the film of polymer material and the at least one layer of the web;
   transferring to the outer surface of the cooling roll a surface layer of a water-based composition comprising a dry matter content, the water-based composition comprising the dry matter content being transferred in a liquid form to the outer surface of the cooling roll;
   transferring the surface layer of the water-based composition on the cooling roll directly to the polymer material in the nip; and
   the web, the polymer material and the water-based composition forming a laminate which leaves the cooling roll.

2. Method according to claim 1, further comprising heating the water-based composition as the water-based composition is situated between the outer surface of the cooling roll and the polymer layer.

3. Method according to claim 2, wherein the water-based composition is heated by the polymer material.

4. Method according to claim 1, wherein the water evaporates from the water-based composition as the laminate leaves the cooling roll.

5. Method according to claim 1, wherein the water-based composition consists of a composition which provides the packaging laminate with an improved characteristic in the group consisting of increased aroma barrier, gas barrier, gloss, grippability, scavenging effect, adhesion or capacity for being easily delaminated.

6. Method according to claim 1, wherein the water-based composition comprises a dry matter content of at least one substance in the group consisting of polyvinyl alcohol, ethylene vinyl alcohol, ethylene acrylic acid, ethylene methacrylic acid, ascorbic acid, vitamin E, Fe or $Fe^{2+}$ compounds, carboxymethylcellulose, polyvinyl acetate and starch.

7. Method according to claim 1, wherein the water-based composition comprises a dry matter content of at least one substance in the group consisting of polyvinyl alcohol, ethylene vinyl alcohol, ethylene acrylic acid, ethylene methacrylic acid, and also a dry matter content of nanoparticles.

8. Method according to claim 1, wherein the viscosity and/or concentration of the water-based composition is/are used in order to control a layer thickness of the said composition in the packaging laminate.

9. Method according to claim 1, wherein the layer transferred to the film of polymer material has a water content of 0.5-8 $g/m^2$ when the layer has just been transferred to the film of polymer material.

10. Method according to claim 1, wherein the transferred surface layer is dried after the packaging laminate has left the cooling roll.

11. Method according to claim 1, wherein the surface layer transferred to the film of polymer material has a weight per unit area of from 0.1 $g/m^2$ up to 10 $g/m^2$ on the basis of dry weights.

12. Method according to claim 1, wherein the film of polymer material comprises at least one polymer in the group consisting of polyethylene, polypropylene, ethylene acrylic acid and ethylene vinyl alcohol.

13. Method according to claim 1, wherein the packaging laminate is, after leaving the cooling roll, provided with at least one further layer which covers the transferred surface layer of the water-based composition.

14. Method according to claim 1, wherein the transferred surface layer of the water-based composition is an external, outermost layer in the packaging laminate.

15. Method according to claim 1, wherein the water-based composition comprises a dry matter content of nanoparticles of clay mineral or $SiO_2$.

16. Method according to claim 1, wherein the surface layer transferred to the film of polymer material has a water content of 1-5 $g/m^2$ when the layer has just been transferred to the film of polymer material.

17. Method for manufacturing a web-shaped packaging laminate comprising:
   applying to an outer surface of a rotatable cooling roll a surface layer of a water-based composition comprising a dry matter content, said water-based composition comprising the dry matter content being applied to the outer surface of the cooling roll in a liquid form;
   rotating said cooling roll in a rotation direction to move said surface layer on said outer surface of the cooling roll into a nip between the cooling roll and a counter-roll, said surface layer being applied in liquid form to said outer surface of the cooling roll upstream of said nip considered with reference to said rotation direction, the surface layer being applied to the outer surface of the cooling roll and rotated to the nip before the surface layer is contacted with any other layer of the packaging laminate;
   feeding a core layer into said nip between said cooling roll and said counter-roll while said cooling roll is rotated to move said surface layer into said nip;
   extruding a film of polymer material into said nip between said cooling roll and said counter-roll while said core layer is fed into said nip and while said cooling roll is rotated to move said surface layer into said nip; and
   joining together said core layer and said film of polymer material in said nip;
   transferring said surface layer on said outer surface of said cooling roll directly to said film of polymer material in said nip to join together the core layer, the film of polymer material and the surface layer to produce at least a portion of the packaging laminate, the surface layer being transferred to said film of polymer material while said film of polymer material is hot to heat said surface layer of water-based composition comprising dry matter content and evaporate water from said surface layer of water-based composition comprising dry matter content.

18. Method according to claim 17, further comprising conveying the core layer, the film of polymer material and the surface layer from the nip to past a dryer to dry the surface layer.

19. Method according to claim 17, wherein the surface layer of the water-based composition comprising the dry matter content is applied to the outer surface of the cooling roll by way of at least one transfer roll.

\* \* \* \* \*